United States Patent
Muldoon et al.

(10) Patent No.: US 11,834,991 B2
(45) Date of Patent: Dec. 5, 2023

(54) LUBRICATION SYSTEM FOR TURBINE ENGINE ELECTRIC MACHINE

(71) Applicant: Raytheon Technologies Corporation, Farmington, CT (US)

(72) Inventors: Marc J. Muldoon, Marlborough, CT (US); Russell B. Witlicki, Wethersfield, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/967,335

(22) Filed: Oct. 17, 2022

(65) Prior Publication Data

US 2023/0120797 A1   Apr. 20, 2023

Related U.S. Application Data

(60) Provisional application No. 63/256,331, filed on Oct. 15, 2021.

(51) Int. Cl.
  *F01D 25/18* (2006.01)
  *F02C 7/06* (2006.01)
  *F02C 7/32* (2006.01)

(52) U.S. Cl.
  CPC ............... *F02C 7/06* (2013.01); *F01D 25/18* (2013.01); *F02C 7/32* (2013.01); *F05D 2220/76* (2013.01); *F05D 2260/98* (2013.01)

(58) Field of Classification Search
  CPC .......... F02C 7/06; F02C 7/32; F05D 2260/98; F05D 2220/76; F01D 25/18
  See application file for complete search history.

(56) References Cited

U.S. PATENT DOCUMENTS

| | | | |
|---|---|---|---|
| 8,205,427 B2 | 6/2012 | Schwarz |
| 8,443,582 B1 | 5/2013 | Phillips |
| 9,018,821 B2 | 4/2015 | Stiesdal |
| 9,917,490 B2 | 3/2018 | Lemmers |
| 10,071,811 B2 | 9/2018 | Kupiszewski |
| 10,308,366 B2 | 6/2019 | Kupiszewski |
| 10,487,839 B2 | 11/2019 | Kupiszewski |
| 10,801,410 B2 | 10/2020 | Roberge |

(Continued)

FOREIGN PATENT DOCUMENTS

| | | |
|---|---|---|
| EP | 3544152 B1 | 10/2020 |
| WO | 2020084241 A1 | 4/2020 |

OTHER PUBLICATIONS

"American National Standard Design Manual for Enclosed Epicyclic Gear Drives", ANSI/AGMA 6023-A88, Nov. 1988.
GB search report for GB2215210.2 dated Mar. 24, 2023.

*Primary Examiner* — Steven M Sutherland
(74) *Attorney, Agent, or Firm* — GETZ BALICH LLC

(57) ABSTRACT

An assembly is provided for a turbine engine. This turbine engine assembly includes an electric machine, a turbine engine component and a lubrication system. The electric machine includes a rotor and a stator. The turbine engine component is discrete from the electric machine. The lubrication system includes a first lubricant circuit, a second lubricant circuit and a lubricant source fluidly coupled in parallel with the first lubricant circuit and the second lubricant circuit. The first lubricant circuit includes a machine volume for the electric machine. The second lubricant circuit includes a component volume for the turbine engine component.

15 Claims, 3 Drawing Sheets

(56) References Cited

U.S. PATENT DOCUMENTS

| | | |
|---|---|---|
| 10,975,769 B2 | 4/2021 | Segura Martinez De Ilarduya |
| 11,085,515 B2 | 8/2021 | Moniz |
| 2002/0146315 A1* | 10/2002 | Rockwood ............... F16N 7/38 |
| | | 415/111 |
| 2007/0025642 A1 | 2/2007 | Buckland et al. |
| 2007/0256421 A1 | 11/2007 | Dooley |
| 2013/0174575 A1* | 7/2013 | Ertz ......................... F02C 7/06 |
| | | 60/788 |
| 2017/0021147 A1 | 1/2017 | Predick |
| 2017/0211477 A1 | 7/2017 | Menheere |
| 2019/0085715 A1 | 3/2019 | Van Der Merwe |
| 2020/0063606 A1 | 2/2020 | Miller |
| 2021/0010382 A1 | 1/2021 | Davies |
| 2021/0010383 A1 | 1/2021 | Bradley |
| 2021/0010384 A1 | 1/2021 | Bradley |
| 2021/0079850 A1 | 3/2021 | Davies |
| 2022/0029892 A1 | 1/2022 | Hooli et al. |
| 2022/0298923 A1 | 9/2022 | Lighty |

\* cited by examiner

LUBRICATION SYSTEM FOR TURBINE ENGINE ELECTRIC MACHINE

This application claims priority to U.S. Patent Appln. No. 63/256,331 filed Oct. 15, 2021, which is hereby incorporated herein by reference in its entirety.

BACKGROUND OF THE DISCLOSURE

1. Technical Field

This disclosure relates generally to a turbine engine and, more particularly, to a lubrication system for a turbine engine.

2. Background Information

A gas turbine engine may include an electric machine for providing mechanical power and/or electricity. The electric machine is typically connected to a gearbox outside of a core of the engine, where the gearbox is coupled with a rotor within the engine core via a tower shaft. Some efforts have been made to arrange the electric machine within the engine core to reduce overall size of the gas turbine engine. However, there is a need in the art for systems and devices which facilitate arrangement of the electric machine within the engine core.

SUMMARY OF THE DISCLOSURE

According to an aspect of the present disclosure, an assembly is provided for a turbine engine. This turbine engine assembly includes an electric machine, a turbine engine component and a lubrication system. The electric machine includes a rotor and a stator. The turbine engine component is discrete from the electric machine. The lubrication system includes a first lubricant circuit, a second lubricant circuit and a lubricant source fluidly coupled in parallel with the first lubricant circuit and the second lubricant circuit. The first lubricant circuit includes a machine volume for the electric machine. The second lubricant circuit includes a component volume for the turbine engine component.

According to another aspect of the present disclosure, another assembly is provided for a turbine engine. This turbine engine assembly includes an electric machine, a turbine engine component and a lubrication system. The electric machine includes a rotor and a stator. The turbine engine component is discrete from the electric machine. The lubrication system includes a machine volume and a component volume. The lubrication system is configured to direct lubricant from the machine volume to the component volume. The machine volume is in the electric machine. The component volume is at least partially formed by the turbine engine component.

According to still another aspect of the present disclosure, another assembly is provided for a turbine engine. This turbine engine assembly includes an electric machine, a turbine engine component and a lubrication system. The electric machine includes a rotor and a stator. The turbine engine component is discrete from the electric machine. The lubrication system includes a machine volume and a component volume. The lubrication system is configured to direct lubricant to the machine volume and to the component volume in parallel and at a common temperature. The machine volume is in the electric machine. The component volume is at least partially formed by the turbine engine component.

The turbine engine assembly may also include a second turbine engine component discrete from the electric machine. The lubrication system may also be configured to direct the lubricant to a second component volume at a second temperature that is greater than the common temperature. The second component volume may be at least partially formed by the second turbine engine component.

The turbine engine assembly may also include a second turbine engine component discrete from the electric machine. The lubrication system may also include a second component volume. The lubrication system may also be configured to direct the lubricant to the machine volume and the second component volume in parallel. The second component volume may be at least partially formed by the second turbine engine component.

The turbine engine assembly may also include a second turbine engine component discrete from the electric machine. The lubrication system may also include a first lubricant circuit and a second lubricant circuit arranged in parallel with the first lubricant circuit. The first lubricant circuit may include the machine volume and the component volume. The first lubricant circuit may be configured to direct the lubricant to the machine volume at a first temperature. The second lubricant circuit may include a second component volume. The second lubricant circuit may be configured to direct the lubricant to the second component volume at a second temperature that is greater than the first temperature. The second component volume may be at least partially formed by the second turbine engine component.

The electric machine may be configured as a generator during at least one mode of operation.

The electric machine may be configured as a motor during at least one mode of operation.

The turbine engine assembly may also include a compressor section, a combustor section and a turbine section arranged along a rotational axis of the turbine engine. A case may be included that houses the compressor section, the combustor section, the turbine section and the electric machine.

The turbine engine assembly may also include a compressor section, a combustor section, a turbine section and a flowpath extending sequentially through the compressor section, the combustor section and the turbine section. The electric machine may be radially inboard of the flowpath.

The turbine engine component may be configured as or otherwise include a bearing.

The first lubricant circuit may be configured to deliver lubricant to the machine volume at a first temperature. The second lubricant circuit may be configured to deliver the lubricant to the component volume at a second temperature that is greater than the first temperature.

The machine volume may be within the electric machine.

The component volume may be at least partially defined by the turbine engine component.

The turbine engine assembly may also include a second turbine engine component. The first lubricant circuit may also include a second component volume for the second turbine engine component. The second component volume may be downstream of the component volume.

The second turbine engine component may be configured as or otherwise include a bearing.

The second turbine engine component may be configured as or otherwise include a seal assembly.

The turbine engine assembly may also include a third turbine engine component. The first lubricant circuit may also include a first branch and a second branch. The first branch may be configured to direct lubricant out of the electric machine to the second component volume. The second branch may be configured to direct the lubricant out of the electric machine to the third component volume for the third turbine engine component.

The turbine engine assembly may also include a second turbine engine component. The first lubricant circuit may also include a second component volume for the second turbine engine component. The second component volume may be configured in parallel with the component volume.

The second turbine engine component may be configured as or otherwise include a damper.

The present disclosure may include any one or more of the individual features disclosed above and/or below alone or in any combination thereof The foregoing features and the operation of the invention will become more apparent in light of the following description and the accompanying drawings.

DETAILED DESCRIPTION

Figure 1:
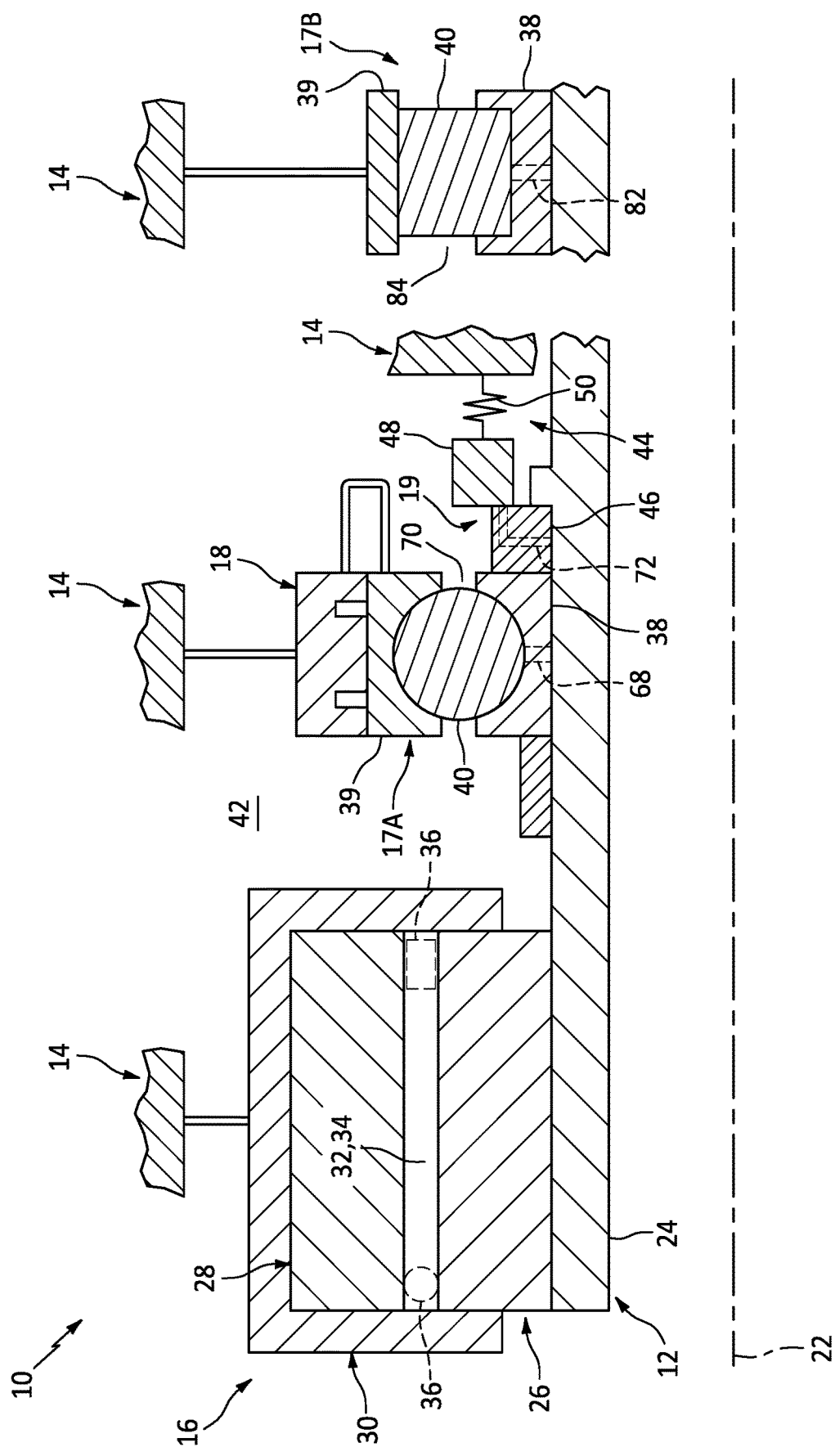
FIG. 1 is partial side sectional illustration of an assembly for a turbine engine.

FIG. 1 illustrates an assembly 10 for a turbine engine. This turbine engine assembly 10 includes a rotating structure 12, a stationary structure 14 and an electric machine 16. The turbine engine assembly 10 also includes one or more rotating structure bearings 17A and 17B (generally referred to as "17"), a fluid damper 18 and at least one seal assembly 19.

The rotating structure 12 extends axially along and circumferentially around a rotational axis 22, which rotational axis 22 may be an axial centerline of the turbine engine assembly 10. The rotating structure 12 is rotatable about the rotational axis 22. The rotating structure 12 may be configured as or otherwise include any rotatable component or assembly of rotatable components within the turbine engine. The rotating structure 12 of FIG. 1, for example, is configured as or otherwise include a turbine engine shaft 24. In some embodiments, the rotating structure 12 may also include one or more additional elements such as, but not limited to, sleeves, spacers, rotors, etc. Furthermore, while the turbine engine shaft 24 is generally depicted as a single monolithic body, the turbine engine shaft 24 may alternatively include a plurality of interconnected shafts/shaft segments.

The stationary structure 14 may be configured as or otherwise include any stationary (e.g., static, non-rotating) component or assembly of stationary components within the turbine engine. The stationary structure 14, for example, may include a turbine engine case and one or more internal support structures within and connected to the turbine engine case.

The electric machine 16 is configurable as an electric motor and/or an electric generator. For example, during a motor mode of operation, the electric machine 16 may operate as the electric motor to convert electricity (e.g., received from a battery and/or another electricity source) into mechanical power; e.g., torque. This mechanical power may be utilized for various purposes within the turbine engine such as, for example, rotating the rotating structure 12 during turbine engine startup. During a generator mode of operation, the electric machine 16 may operate as the electric generator to convert mechanical power (e.g., received through the rotating structure 12) into electricity. This electricity may be utilized for various purposes within the turbine engine such as, for example, electrically powering one or more electric components of the turbine engine and/or charging the battery. The electricity may also or alternatively be utilized for various purposes outside of the turbine engine such as, for example, electrically powering one or more electrical components in an aircraft.

The electric machine 16 includes an (e.g., annular) electric machine rotor 26 and an (e.g., annular) electric machine stator 28. The electric machine 16 also includes an (e.g., annular) electric machine case 30 that at least partially or completely houses the machine rotor 26 and/or the machine stator 28.

The machine rotor 26 is at least partially disposed within an internal cavity 32 of the machine case 30. The machine rotor 26 is connected (e.g., fixedly mounted) to the rotating structure 12 and its turbine engine shaft 24. The machine rotor 26 is configured to rotate with the rotating structure 12 and its turbine engine shaft 24 about the rotational axis 22.

The machine stator 28 is (e.g., completely) disposed within the internal cavity 32 of the machine case 30. The machine stator 28 is connected (e.g., fixedly mounted) to the stationary structure 14. The machine stator 28 of FIG. 1, for example, is fixedly connected to the machine case 30, and the machine case 30 is fixedly connected to the stationary structure 14.

The machine stator 28 of FIG. 1 axially overlaps the machine rotor 26 along the rotational axis 22, and extends circumferentially about (e.g., completely around, circumscribes) the machine rotor 26. The machine rotor 26 of FIG. 1 is thereby disposed within a bore of the machine stator 28. However, the machine rotor 26 may be radially spaced from the machine stator 28 by an annular radial clearance gap 34; e.g., an air gap. The machine rotor 26 may thereby be located in close proximity to, but may not contact, the machine stator 28.

The electric machine 16 may also include one or more internal electric machine bearings 36 (schematically shown). Each of these bearings 36 may be configured as a rolling element bearing. One of the bearings 36, for example, maybe configured as a ball bearing, and the other one of the bearings 36 may be configured as a roller bearing. These bearings 36 are arranged within the internal cavity 32 of the machine case 30. The bearings 36 are disposed radially between and are engaged with the machine rotor 26 and a stationary structure of the electric machine 16; e.g., the machine stator 28 of FIG. 1. The bearings 36 may thereby rotatably support the machine rotor 26 within the electric machine 16 as well as maintain the clearance gap 34 between the machine rotor 26 and the machine stator 28.

Each of the assembly components 17-19 of FIG. 1 is arranged discrete from the electric machine 16. Each assembly component 17A, 17B, 18, 19, for example, is arranged outside of and/or spaced from the electric machine 16 and its machine case 30.

The first bearing 17A may be arranged close to the electric machine 16. The first bearing 17A of FIG. 1, for example, is axially spaced from the electric machine 16 and its machine case 30 by an axial gap. The second bearing 17B may be arranged further away from the electric machine 16; e.g., proximate another end of the rotating structure 12.

Each of the bearings 17 may be configured as a rolling element bearing. Each bearing 17 of FIG. 1, for example, includes a bearing inner race 38, a bearing outer race 39 and a plurality of bearing rolling elements 40. The inner race 38 is connected (e.g., fixedly mounted) to the rotating structure 12 and its turbine engine shaft 24. The outer race 39 is connected (e.g., fixedly mounted) to the stationary structure 14. The rolling elements 40 are arranged circumferentially about the rotational axis 22 in an array, and disposed radially between and engaged with the inner race 38 and the outer race 39. With this arrangement, the bearings 17 are configured to rotatably mount the rotating structure 12 with the stationary structure 14.

The damper 18 is (e.g., radially) between and engaged with the first bearing 17A and the stationary structure 14. The damper 18 of FIG. 1, for example, supports the outer race 39 of the first bearing 17A, and is connected (e.g., fixedly mounted) to the stationary structure 14. The damper 18 is configured to facilitate slight controlled (e.g., damped) movement (e.g., axial and/or circumferential shifting) between the first bearing 17A and its outer race 39, and the stationary structure 14.

The seal assembly 19 is configured to seal an annular gap between the rotating structure 12 and the stationary structure 14, or alternatively another component connected to the stationary structure 14. The seal assembly 19 may thereby fluidly isolate a first compartment 42 (e.g., a bearing and/or electric machine cavity) within the turbine engine from a second compartment 44 within the turbine engine.

The seal assembly 19 of FIG. 1 includes a seal land 46 and a seal element 48 (e.g., a carbon seal element). The seal land 46 is connected (e.g., fixedly mounted) to the rotating structure 12. The seal land 46 is configured to rotate with the rotating structure 12. The seal element 48 is connected (e.g., spring mounted) to the stationary structure 14 (or another component) via a biasing device 50; e.g., a spring. This biasing device 50 is configured to bias (e.g., push) the seal element 48 against the seal land 46 to maintain sealing engagement between these seal assembly components 46 and 48.

Figure 2:
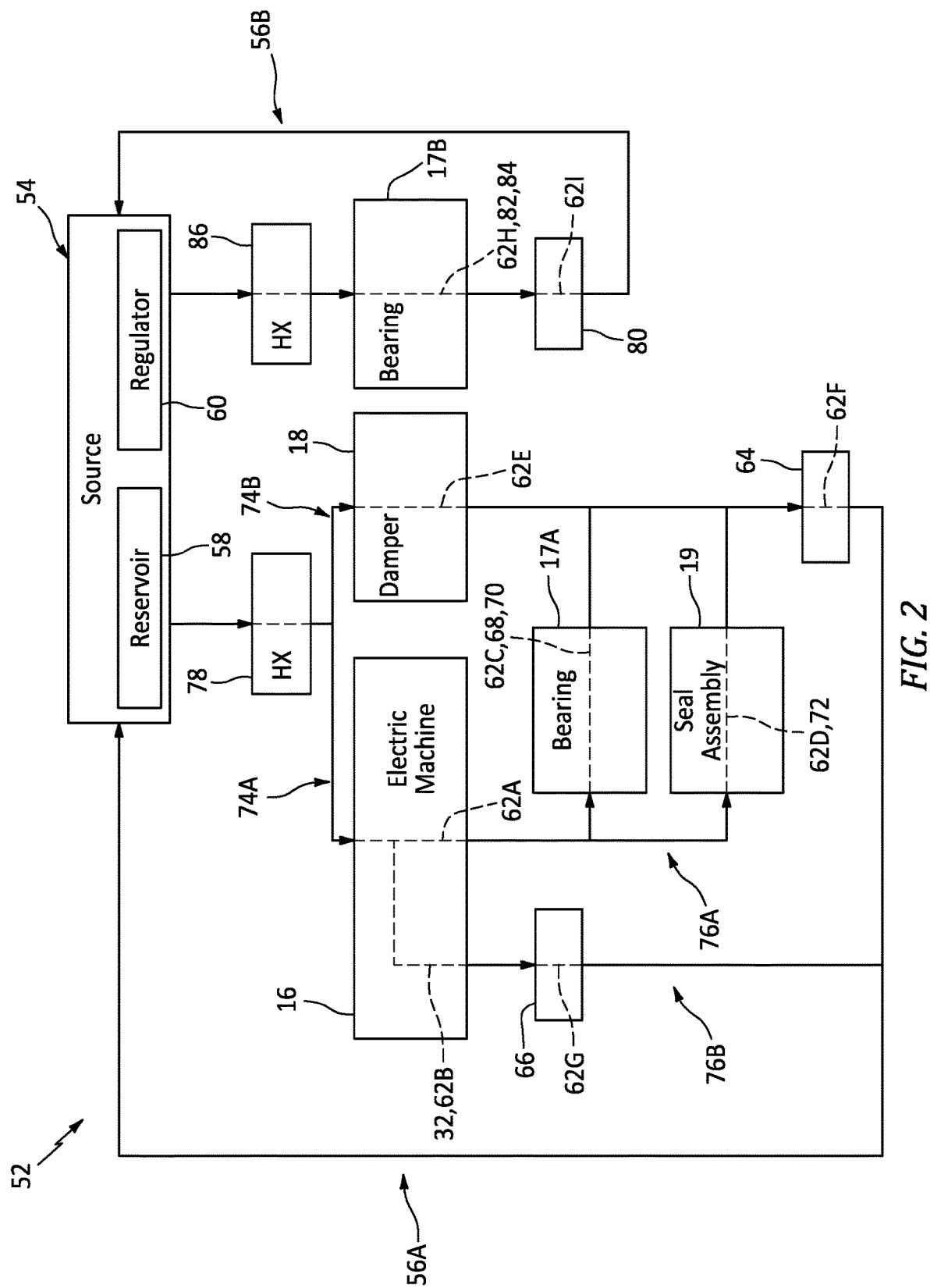
FIG. 2 is a schematic illustration of a lubrication system for the turbine engine assembly.

Various components of the turbine engine assembly 10 may utilize lubricant (e.g., oil or another liquid) during turbine engine operation. This lubricant may lubricate the assembly components and/or cool the assembly components. FIG. 2 schematically illustrates a lubrication system 52 for providing the lubricant to the turbine engine assembly 10. This lubrication system 52 includes a lubricant source 54 and one or more lubricant circuits 56A and 56B (generally referred to as "56").

The lubricant source 54 is configured to provide the lubricant to the lubricant circuits 56 during lubrication system operation. The lubricant source 54 may also be configured to store (e.g., contain a quantity of) the lubricant before, during and/or after lubrication system operation. The lubricant source 54 of FIG. 2, for example, includes a lubricant reservoir 58 and a lubricant flow regulator 60. The lubricant flow regulator 60 may be or otherwise include a pump and/or a valve. This lubricant flow regulator 60 is configured to direct the lubricant received from the lubricant reservoir 58 to the lubricant circuits 56.

The lubricant circuits 56 may be arranged fluidly in parallel with one another and/or otherwise fluidly independent from one another. The lubricant source 54 of FIG. 2, for example, is fluidly coupled in parallel with the first lubricant circuit 56A and the second lubricant circuit 56B. The first lubricant circuit 56A may thereby be fluidly independent of the second lubricant circuit 56B. More particularly, the lubricant received by the first lubricant circuit 56A may be received from the lubricant source 54 and its flow regulator 60 (e.g., as a supply) and/or provided to the lubricant source 54 (e.g., as a return) independent of (e.g., not through, not by way of) the second lubricant circuit 56B. Similarly, the second lubricant circuit 56B may be fluidly independent of the first lubricant circuit 56A. More particularly, the lubricant received by the second lubricant circuit 56B may be received from the lubricant source 54 and its flow regulator 60 (e.g., as a supply) and/or provided to the lubricant source 54 (e.g., as a return) independent of the first lubricant circuit 56A.

The first lubricant circuit 56A includes one or more internal volumes 62A-G for one or more respective components 16, 17A, 18, 19, 64 and 66 of the turbine engine. Each of the internal volumes 62A-G may be or otherwise include an internal cavity, an internal passage and/or another space within and/or at least partially or completely formed by a respective turbine engine component, which internal volume is adapted to receive the lubricant. For example, the first machine volume 62A may be configured as or otherwise include a passage within the electric machine 16. The second machine volume 62B may be configured as or otherwise includes a cavity (e.g., the internal cavity 32 of FIG. 1 and/or a bearing cavity) within the electric machine 16. The first bearing volume 62C may be configured as or otherwise includes a passage 68 within and/or a space 70 at least partially formed by the first bearing 17A; see also FIG. 1. The seal assembly volume 62D may be configured as or otherwise include a passage 72 within and/or a space at least partially formed by the seal assembly 19 and one or more of its components 46 and 48; see also FIG. 1. The damper volume 62E may be configured as or otherwise include a passage within and/or a space at least partially formed by the damper 18. The first collector volume 62F may be configured as or otherwise include a space at least partially formed by the first lubricant collector 64; e.g., a sump, a gutter, etc. The second collector volume 62G may be configured as or otherwise include a space at least partially formed by the second lubricant collector 66; e.g., a sump, a gutter, etc. The lubrication system 52 of the present disclosure, however, is not limited to the foregoing exemplary internal volumes nor the foregoing exemplary collection of turbine engine components. For example, in other embodiments, any one or more of the internal volumes 62C-G may be omitted from the first lubricant circuit 56A.

The first lubricant circuit 56A of FIG. 2 includes a first branch 74A and a second branch 74B. The first branch 74A and the second branch 74B are arranged in parallel with one another. An outlet from the lubricant source 54 of FIG. 2, for example, is fluidly coupled with an inlet to the first branch 74A and an inlet to the second branch 74B in parallel.

The first branch 74A includes a first sub-branch 76A and a second sub-branch 76B. The first sub-branch 76A and the second sub-branch 76B are arranged in parallel with one another. The first sub-branch 76A includes the first machine volume 62A, the first bearing volume 62C, the seal assembly volume 62D and the first collector volume 62F. The first machine volume 62A is fluidly upstream of the first bearing volume 62C and the seal assembly volume 62D. The first machine volume 62A of FIG. 2 is fluidly coupled to the first bearing volume 62C and the seal assembly volume 62D in parallel; e.g., where each volume is in its own additional sub-branch. The first bearing volume 62C and the seal assembly volume 62D are each upstream of the first collector volume 62F. This first collector volume 62F of FIG. 2 is fluidly coupled with the first bearing volume 62C and the seal assembly volume 62D in parallel. The second sub-branch 76B includes the second machine volume 62B and the second collector volume 62G. The second machine volume 62B is fluidly upstream of the second collector volume 62G. Outlets from the first and the second collector volumes 62F and 62G are fluidly coupled with the lubricant source 54 and its lubricant reservoir 58.

The second branch 74B includes the damper volume 62E and the first collector volume 62F. The damper volume 62E is fluidly upstream of and coupled with the first collector volume 62F. The first collector volume 62F of FIG. 2, for example, is fluidly coupled with the first sub-branch 76A and the second branch 74B in parallel.

The first lubricant circuit 56A is configured to direct the lubricant to one or more of the internal volumes (e.g., 62A, 62B and 62E) at or about (e.g., within one to five degrees Celsius of) a first circuit temperature, for example, during normal turbine engine operation. The first lubricant circuit 56A, for example, includes a first circuit heat exchanger 78 configured to cool or heat the lubricant provided to the first branch 74A and its sub-branches 76A and 76B and/or the second branch 74B to or about the first circuit temperature. This first circuit temperature may be selected (e.g., optimized) for operation of the electric machine 16. For example, the first circuit temperature may be relatively cool to reduce or prevent heat related degradation of material(s) such as resin, etc. within the electric machine 16 and its windings. However, as the lubricant flows through the electric machine 16, the lubricant may be heated to an elevated second temperature that is greater than the first circuit temperature, for example, during normal turbine engine operation. The first bearing volume 62C and the seal assembly volume 62D may thereby receive the lubricant at or about the second temperature, where the first lubricant circuit 56A may be configured such that the second temperature is selected (e.g., optimized) for operation of the first bearing 17A and/or the seal assembly 19. The second temperature, for example, may be five degrees Celsius (5° C.), ten degrees Celsius (10° C.), twenty degrees Celsius (20° C.) or more than the first circuit temperature. The present disclosure, however, is not limited to such an exemplary lubricant temperature relationship.

The second lubricant circuit 56B includes one or more internal volumes 62H and 62I for one or more respective components 17B and 80 of the turbine engine. Each of the internal volumes 62H and 62I may be or otherwise include an internal cavity, an internal passage and/or another space within and/or at least partially or completely formed by a respective turbine engine component, which internal volume is adapted to receive the lubricant. For example, the second bearing volume 62H may be configured as or otherwise include a passage 82 within and/or a space 84 at least partially formed by the first bearing 17B; see also FIG. 1. The third collector volume 62I may be configured as or otherwise include a space at least partially formed by the third lubricant collector 80; e.g., a sump, a gutter, etc. The lubrication system 52 of the present disclosure, however, is not limited to the foregoing exemplary internal volumes nor the foregoing exemplary collection of turbine engine components. For example, in other embodiments, the internal volume 62I may be omitted from the second lubricant circuit 56B.

The second bearing volume 62H is fluidly upstream of the third collector volume 62I. An outlet from the third collector volume 62I is fluidly coupled with the lubricant source 54 and its lubricant reservoir 58.

The second lubricant circuit 56B is configured to direct the lubricant to the second bearing volume 62H at or about a second circuit temperature, for example, during normal turbine engine operation. The second lubricant circuit 56B, for example, includes a second circuit heat exchanger 86 configured to cool or heat the lubricant provided to the second bearing volume 62H to or about the second circuit temperature. This second circuit temperature may be selected (e.g., optimized) for operation of the second bearing 17B. For example, the second circuit temperature may be relatively warm. The second circuit temperature, for example, may be thirty to sixty degrees Celsius (30-60° C.) greater than the first circuit temperature; e.g., between forty to fifty degrees Celsius (40-50° C.) greater than the first circuit temperature. The present disclosure, however, is not limited to such an exemplary lubricant temperature relationship.

With the foregoing configuration, the lubrication system 52 may provide the lubricant to the various internal volumes 62A-I for the turbine engine components 16-19 at different temperatures generally tailored for operation of those respective turbine engine components 16-19. Providing the single lubrication system 52 for the various turbine engine components 16-19 may also reduce space requirements within the turbine engine since at least some of the lubricant circuits 56 and/or the branches 74A and 74B, 76A and 76B share common elements; e.g., the lubricant source 54, the first circuit heat exchanger 78, etc.

In some embodiments, a passage leading to the damper 18 may be configured as a bleed passage. This bleed passage may bleed a portion (e.g., less than 30%, 20% or 10%) of the lubricant from a main passage that leads to the electric machine 16. The bleed passage, for example, may be configured with a smaller size (e.g., width, diameter) than that of the main passage such that more of the lubricant flows to the electric machine 16 than the damper 18.

The lubrication system 52 is described above providing the lubricant to certain exemplary components 16-19. Of course, in other embodiments, any one or more of the turbine engine components 17A, 17B, 18 and/or 19 may be replaced by another component of the turbine engine which may utilizes the lubricant, for example, for heating, cooling and/or lubrication. One or more of the lubricant circuits 56A and 56B may also or alternatively include one or more additional fluid components other than those described above. Examples of these other components may include, but are not limited to, heat exchanger(s), sensor(s), manifold(s), additional bearing(s), a gear train, nozzle(s), etc.

Figure 3:
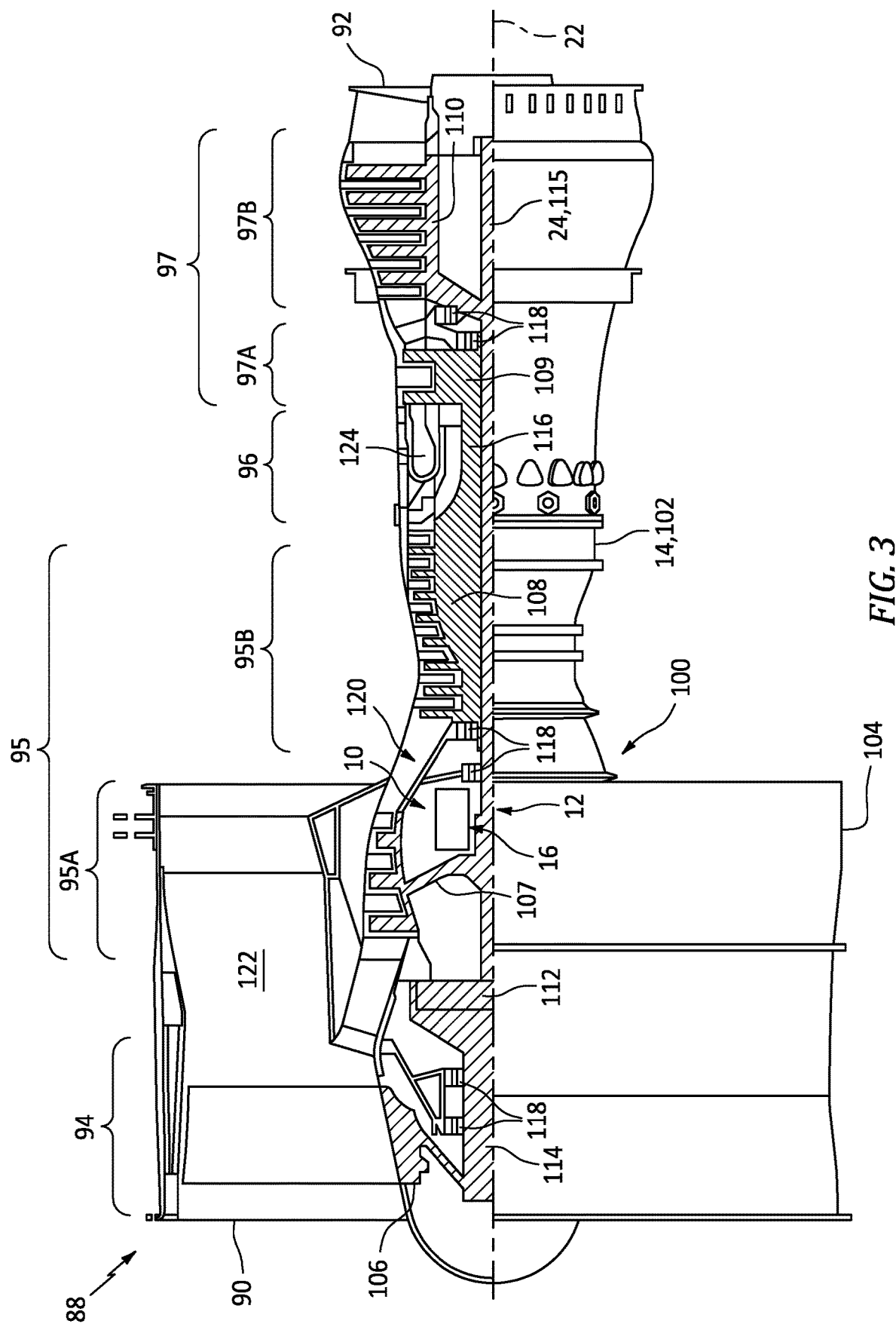
FIG. 3 is a side cutaway illustration of a geared turbofan gas turbine engine.

FIG. 3 illustrates an example of the turbine engine with which the turbine engine assembly 10 and its lubrication system 52 (see FIG. 2) may be configured. This turbine engine is configured as a geared, turbofan gas turbine engine 88. This turbine engine 88 extends along the rotational axis 22 between an upstream airflow inlet 90 and a downstream airflow exhaust 92. The turbine engine 88 includes a fan section 94, a compressor section 95, a combustor section 96 and a turbine section 97. The compressor section 95 includes a low pressure compressor (LPC) section 95A and a high pressure compressor (HPC) section 95B. The turbine section 97 includes a high pressure turbine (HPT) section 97A and a low pressure turbine (LPT) section 97B.

The engine sections 94-97 are arranged sequentially along the rotational axis 22 within an engine housing 100. This engine housing 100 includes an inner case 102 (e.g., a core case) and an outer case 104 (e.g., a fan case). The inner case 102 may house one or more of the engine sections 95A-97B (e.g., an engine core) as well as the electric machine 16. The outer case 104 may house at least the fan section 94.

Each of the engine sections 94, 95A, 95B, 97A and 97B includes a respective rotor 106-110. Each of these rotors 106-110 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 106 is connected to a gear train 112, for example, through a fan shaft 114. The gear train 112 and the LPC rotor 107 are connected to and driven by the LPT rotor 110 through a low speed shaft 115. The HPC rotor 108 is connected to and driven by the HPT rotor 109 through a high speed shaft 116. The shafts 114-116 are rotatably supported by a plurality of bearings 118; e.g., rolling element bearings. Each of these bearings 118 is connected to the engine housing 100 by, for example, an annular support strut.

During operation, air enters the turbine engine 88 through the airflow inlet 90. This air is directed through the fan section 94 and into a core flowpath 120 and a bypass flowpath 122. The core flowpath 120 extends sequentially through the engine sections 95A-97B. The air within the core flowpath 120 may be referred to as "core air". The bypass flowpath 122 extends through a bypass duct, which bypasses the engine core. The air within the bypass flowpath 122 may be referred to as "bypass air".

The core air is compressed by the LPC rotor 107 and the HPC rotor 108 and directed into a combustion chamber 124 of a combustor in the combustor section 96. Fuel is injected into the combustion chamber 124 and mixed with the compressed core air to provide a fuel-air mixture. This fuel air mixture is ignited and combustion products thereof flow through and sequentially cause the HPT rotor 109 and the LPT rotor 110 to rotate. The rotation of the HPT rotor 109 and the LPT rotor 110 respectively drive rotation of the HPC rotor 108 and the LPC rotor 107 and, thus, compression of the air received from a core airflow inlet. The rotation of the LPT rotor 110 also drives rotation of the fan rotor 106, which propels bypass air through and out of the bypass flowpath 122. The propulsion of the bypass air may account for a majority of thrust generated by the turbine engine 88, e.g., more than seventy-five percent (75%) of engine thrust. The turbine engine of the present disclosure, however, is not limited to the foregoing exemplary thrust ratio.

The turbine engine assembly 10 may be configured at various different locations within the turbine engine 88. For example, the turbine engine assembly 10 and its electric machine 16 may be housed within the engine housing 100 and, more particularly, the inner case 102. The stationary structure 14, for example, may be or otherwise include the inner case 102. The electric machine 16 may also be disposed radially inboard of the core flowpath 120, where the core flowpath 120 axially overlaps and extends circumferentially about (e.g., completely around, circumscribes) the electric machine 16. For example, the electric machine 16 may be arranged with / axially aligned with the compressor section 95, where the turbine engine shaft 24 may be one of the shafts 114-116 (e.g., 115) and the bearings 17A and 17B (see FIG. 1) may be a set of the bearings 118 supporting the respective shaft. The present disclosure, however, is not limited to such an exemplary arrangement. For example, in other embodiments, the turbine engine assembly 10 and its electric machine 16 may also or alternatively be arranged with/aligned with another one or more sections 94, 96 and/or 97 of the turbine engine 88.

The turbine engine assembly 10 may be included in various turbine engines other than the one described above. The turbine engine assembly 10, for example, may be included in a geared turbine engine where a gear train connects one or more shafts to one or more rotors in a fan section, a compressor section and/or any other engine section. Alternatively, the turbine engine assembly 10 may be included in a direct drive turbine engine configured without a gear train. The turbine engine assembly 10 may be included in a turbine engine configured with a single spool, with two spools (e.g., see FIG. 3), or with more than two spools. The turbine engine may be configured as a turbofan engine, a turbojet engine, a turboprop engine, a turboshaft engine, a propfan engine, a pusher fan engine or any other type of turbine engine. The turbine engine may alternative be configured as an auxiliary power unit (APU) or an industrial gas turbine engine. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a turbine engine, comprising:
   an electric machine including a rotor and a stator;
   a turbine engine component discrete from the electric machine; and
   a lubrication system including a first lubricant circuit, a second lubricant circuit and a lubricant source fluidly coupled in parallel with the first lubricant circuit and the second lubricant circuit, the first lubricant circuit comprising a machine volume for the electric machine, and the second lubricant circuit comprising a component volume for the turbine engine component;
   the first lubricant circuit configured to deliver lubricant to the machine volume at a first temperature; and
   the second lubricant circuit configured to deliver the lubricant to the component volume at a second temperature that is greater than the first temperature.

2. The assembly of claim 1, wherein the electric machine is configured as a generator during at least one mode of operation.

3. The assembly of claim 1, wherein the electric machine is configured as a motor during at least one mode of operation.

4. The assembly of claim 1, further comprising:
   a compressor section, a combustor section and a turbine section arranged along a rotational axis of the turbine engine; and
   a case housing the compressor section, the combustor section, the turbine section and the electric machine.

5. The assembly of claim 1, further comprising:
   a compressor section, a combustor section, a turbine section and a flowpath extending sequentially through the compressor section, the combustor section and the turbine section;
   the electric machine radially inboard of the flowpath.

6. The assembly of claim 1, wherein the turbine engine component comprises a bearing.

7. The assembly of claim 1, wherein the machine volume is within the electric machine.

8. The assembly of claim 1, wherein the component volume is at least partially defined by the turbine engine component.

9. The assembly of claim 1, further comprising:
a second turbine engine component;
the first lubricant circuit further comprising a second component volume for the second turbine engine component, and the second component volume downstream of the component volume.

10. The assembly of claim 9, wherein the second turbine engine component comprises a bearing.

11. The assembly of claim 9, wherein the second turbine engine component comprises a seal assembly.

12. The assembly of claim 9, further comprising:
a third turbine engine component;
the first lubricant circuit further comprising a first branch and a second branch;
the first branch is configured to direct the lubricant out of the electric machine to the second component volume; and
the second branch is configured to direct the lubricant out of the electric machine to the third component volume for the third turbine engine component.

13. The assembly of claim 1, further comprising:
a second turbine engine component;
the first lubricant circuit further comprising a second component volume for the second turbine engine component, and the second component volume configured in parallel with the component volume.

14. An assembly for a turbine engine, comprising:
an electric machine including a rotor and a stator;
a turbine engine component discrete from the electric machine;
a lubrication system including a first lubricant circuit, a second lubricant circuit and a lubricant source fluidly coupled in parallel with the first lubricant circuit and the second lubricant circuit, the first lubricant circuit comprising a machine volume for the electric machine, and the second lubricant circuit comprising a component volume for the turbine engine component; and
a second turbine engine component, wherein the second turbine engine component comprises a damper;
the first lubricant circuit further comprising a second component volume for the second turbine engine component, and the second component volume configured in parallel with the component volume.

15. An assembly for a turbine engine, comprising:
an electric machine including a rotor and a stator;
a turbine engine component discrete from the electric machine;
a lubrication system including a machine volume and a component volume, the lubrication system configured to direct lubricant from the machine volume to the component volume, the machine volume in the electric machine, and the component volume at least partially formed by the turbine engine component; and
a second turbine engine component discrete from the electric machine;
the lubrication system further including a first lubricant circuit and a second lubricant circuit arranged in parallel with the first lubricant circuit;
the first lubricant circuit comprising the machine volume and the component volume, and the first lubricant circuit configured to direct the lubricant to the machine volume at a first temperature; and
the second lubricant circuit comprising a second component volume, the second lubricant circuit configured to direct the lubricant to the second component volume at a second temperature that is greater than the first temperature, and the second component volume at least partially formed by the second turbine engine component.

* * * * *